United States Patent [19]
Schmahl et al.

[11] Patent Number: 5,764,931
[45] Date of Patent: Jun. 9, 1998

[54] METHOD AND APPARATUS FOR PASSING BUS MASTERSHIP BETWEEN PROCESSORS USING PREDEFINED BUS MASTERSHIP STATES

[75] Inventors: Kenneth A. Schmahl, San Jose; Matthew J. Tedone; John C. Schell, both of Sunnyvale; Igor Karminsky, San Jose; Ray P. Chan, Cupertino, all of Calif.

[73] Assignee: Sun Microsystems, Inc., Mountain View, Calif.

[21] Appl. No.: 656,641

[22] Filed: May 31, 1996

[51] Int. Cl.$^6$ .................... G06F 13/14; G06F 13/38
[52] U.S. Cl. ............................. 395/287; 395/559
[58] Field of Search ................. 395/287, 200.55, 395/856, 559, 299, 290; 370/451

[56] References Cited

U.S. PATENT DOCUMENTS

| | | | |
|---|---|---|---|
| 4,737,932 | 4/1988 | Baba | 395/287 |
| 5,287,486 | 2/1994 | Yamasaki et al. | 395/842 |
| 5,371,739 | 12/1994 | Knapczyk | 370/449 |
| 5,444,855 | 8/1995 | Thompson | 395/287 |
| 5,630,077 | 5/1997 | Krein et al. | 395/293 |

*Primary Examiner*—Gopal C. Ray
*Attorney, Agent, or Firm*—Blakely Sokoloff Taylor & Zafman

[57] ABSTRACT

A method for passing mastership of a bus is described. According to the method, it is determined whether to use the bus. If the bus is to be used, it is determined whether the bus is available. If the bus is available, the bus is accessed and a signal is generated to indicate that the bus is being accessed. A timer is also started and access to the bus is yielded when the timer expires. A processor that passes mastership to a shared resource is also described. The processor comprises a resource accessing unit. The resource accessing unit allows the processor to access a resource upon receiving a first signal from a component coupled to the resource. The resource accessing unit yields access of the resource to the component upon receiving a second signal from the component.

16 Claims, 6 Drawing Sheets

| State | Device 1 | Device 2 | Mastership |
|-------|----------|----------|------------|
| 1 | 0 | 0 | Device 1 is master |
| 2 | 1 | 0 | Mastership is to be passed from Device 1 to Device 2 |
| 3 | 1 | 1 | Device 2 is master |
| 4 | 0 | 1 | Mastership is to be passed from Device 2 to Device 1 |

METHOD AND APPARATUS FOR PASSING BUS MASTERSHIP BETWEEN PROCESSORS USING PREDEFINED BUS MASTERSHIP STATES

FIELD OF THE INVENTION

The present invention pertains to the field of bus regulation. More specifically, the present invention relates to an apparatus and method for passing bus mastership between multiple devices.

BACKGROUND OF THE INVENTION

When multiple devices reside on a bus, coordination of access to the bus is necessary. Coordination of access to the bus insures that multiple devices desiring to communicate will not assert control and data lines for different transfers at the same time and cause bus contention.

One approach to coordinating bus access is the use of one or more bus masters in the system. A bus master controls access to the bus. It initiates and controls all bus requests. A processor must be able to initiate a bus request for access to a memory device and thus is always a bus master. A memory device is usually a slave since it will respond to read and write requests but never generate its own requests.

A bus has multiple masters when there are multiple central processing units (CPUs) or when input/output (I/O) devices can initiate a bus transaction. If there are multiple masters, an arbitration scheme is required among the masters to decide who gets the bus next. A bus arbiter is typically used to implement the arbitration scheme. In a bus arbitration scheme, a device wanting to use the bus signals a bus request and is later granted the bus. After a grant, the device can use the bus, later signaling to the bus arbiter that the bus is no longer required. The bus arbiter can then grant the bus to another device. Most multiple-master buses have a set of bus signals for performing requests and grants. A bus release line is also needed if each device does not use its own request line to release the bus. Sometimes the signals used for bus arbitration have physically separate lines, while in other systems the data lines of the bus are used for this function. Arbitration is often a fixed priority, as is the case with daisy-chained devices or an approximately fair scheme that randomly chooses which master gets the bus.

The use of a bus arbiter has several drawbacks. The addition of a bus arbiter requires additional power to operate. This is a problem for computer systems operating under tight power constraints. Implementing a bus arbiter also requires additional space in the computer system. Thus, depending upon the environment of the computer system, the availability of physical space may not permit the implementation of a bus arbiter. Perhaps most importantly, the use of an additional component for the purpose of arbitration adds an undesirable cost to the overall computer system.

Thus, what is needed is an apparatus that passes ownership of a resource between a plurality of devices without using an external arbiter.

SUMMARY OF THE INVENTION

A method for passing mastership of a resource is described. According to the method, it is determined whether to use the bus. If the bus is to be used, it is determined whether the bus is available. If the bus is available, the bus is accessed and a signal is generated to indicate that the bus is being accessed. A timer is also started and access to the bus is yielded when the timer expires.

A processor that passes mastership of a shared resource is described. The processor comprises a resource accessing unit. The resource accessing unit allows the processor to access a resource upon receiving a first signal from a component coupled to the resource. The resource accessing unit yields access of the resource to the component upon receiving a second signal from the component. The processor further comprises a signal generation unit. The signal generation unit is coupled to the resource accessing unit. The signal generation unit generates a third signal when the processor has gained access to the resource and generates a fourth signal when the processor has yielded access to the resource.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

A method and apparatus for accessing data in a memory is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
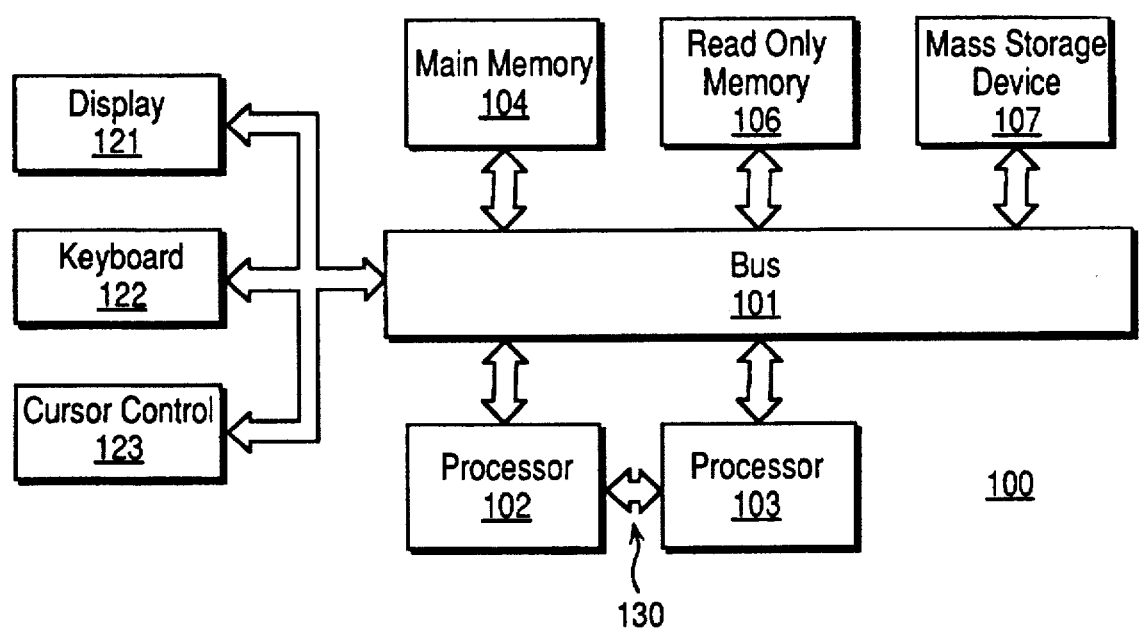
FIG. 1 illustrates a multi-processor computer system implementing an embodiment of the invention.

Referring to FIG. 1, the computer system upon which the preferred embodiment of the present invention can be implemented is shown as 100. Computer system 100 comprises a bus or other communication means 101 for communicating information, and processors 102 and 103 coupled with bus 101 for processing information. System 100 further comprises a random access memory (RAM) or other dynamic storage device 104 (referred to as main memory), coupled to bus 101 for storing information and instructions to be executed by processors 102 and 103. Main memory 104 also may be used for storing temporary variables or other intermediate information during execution of instructions by processors 102 and 103. Computer system 100 also comprises a read only memory (ROM) and/or other static storage device 106 coupled to bus 101 for storing static information and instructions for processors 102 and 103. Data storage device 107 is coupled to bus 101 for storing information and instructions. Instructions from a computer readable media which are executable by processors 102 or 103 may be stored onto data storage device 107. A data storage device 107 such as a magnetic disk or optical disk and its corresponding disk drive can be coupled to computer system 100.

Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processors 102 and 103. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

FIG. 1 illustrates one embodiment of the present invention where bus 101 is shared between two processors 102 and 103 in the same computer system 100. In order to prevent bus contention, only one of processors 102 or 103 may access bus 101 at one time. Processor 102 is only allowed to access bus 101 during its designated bus mastership state. Similarly, processor 103 is only allowed to access bus 101 during its designated bus mastership state. The bus mastership state of the system is determined by tokens or signals that processors 102 and 103 generate. In one embodiment of the present invention, processors 102 and 103 generate a signal on line 130 each time they gain access to bus 101, relinquish access to bus 101 or wish to gain access to bus 101. In another embodiment of the present invention, the signal generated by one of the processors on line 130 may be a single signal or a plurality of signals. The signals generated by processor 102 are sent to processor 103 via line 130 and the signals generated by processor 103 are sent to processor 102 via line 130. Each processor has a copy of the signals generated by itself and the signals generated by the other processor. Each processor is aware of the current bus mastership state of the system 100.

Figure 2:
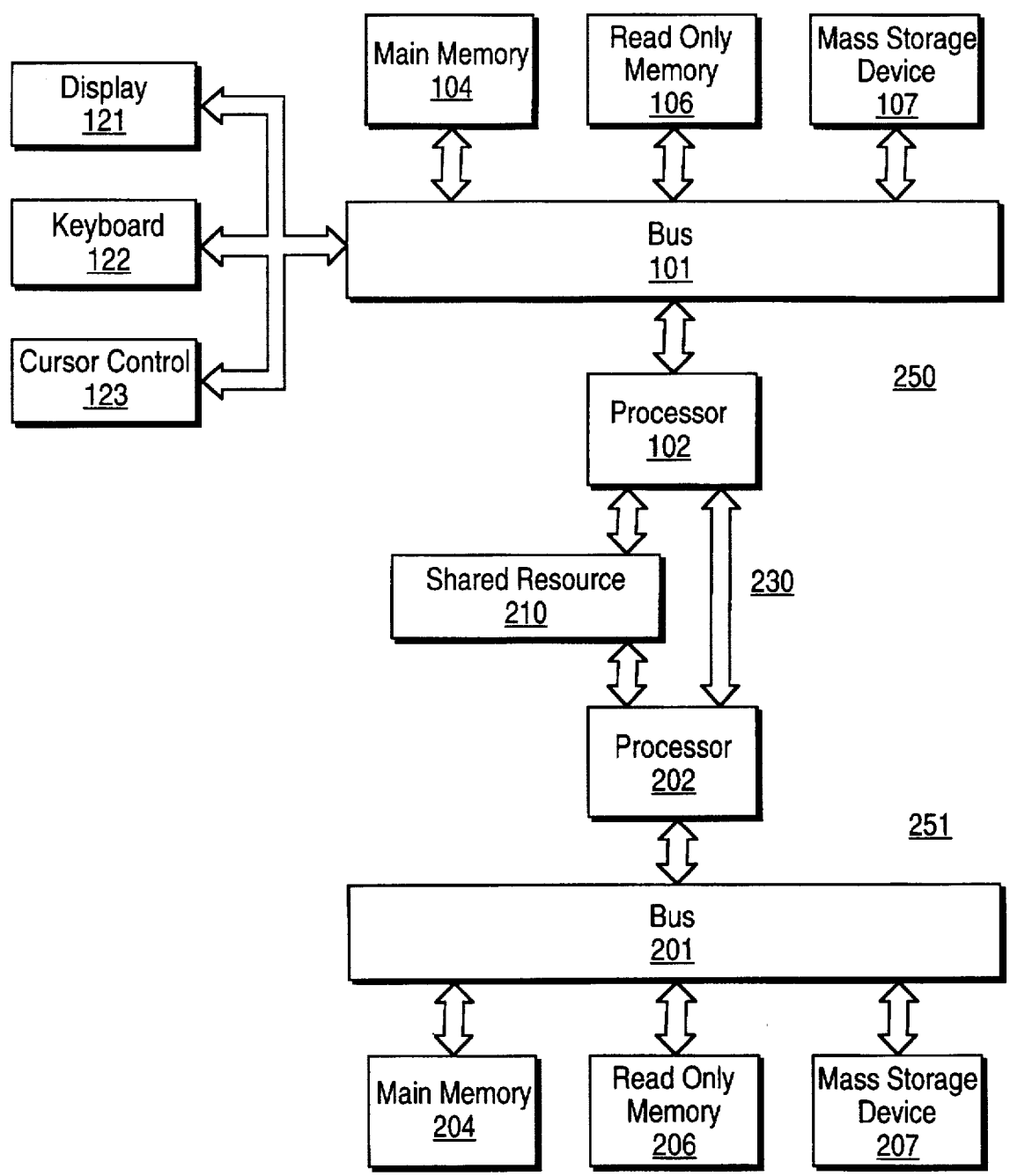
FIGS. 2 illustrates processors from two different computer systems implementing an embodiment of the invention.

FIG. 2 illustrates an embodiment of the present invention where a processor 102 from a first computer system 250 and a second processor 202 from a second computer system 251 share access to a shared resource 210. Shared resource 210 is a resource which may be accessed by only one of either processor 102 or processor 202 at one time. Shared resource 210 may be, for example, a bus or a memory. Shared resource 210 may be directly coupled to processor 102 and 202 or coupled to processors 102 and 202 via other buses or components. Processor 102 is only allowed to access shared resource 210 during its designated resource mastership state. Processor 202 is only allowed to access shared resource 210 during its designated resource mastership state. The resource mastership state of the systems is determined by tokens or signals that the processors 102 and 202 generate. In one embodiment of the present invention, processors 102 and 202 generate a signal each time they gain access to shared resource 210, relinquish access to shared resource 210 or wish to gain access to shared resource 210. In one embodiment of the present invention, the signal generated by the processor 102 or 210 may be a single signal or a plurality of signals. The signals generated by processor 102 are sent to processor 202 on line 230 and the signals generated by processor 202 are sent to processor 102 on line 230. Each processor has a copy of the signals generated by itself and the other processor. Each processor is aware of the current bus mastership state of the computer systems.

Figure 3:
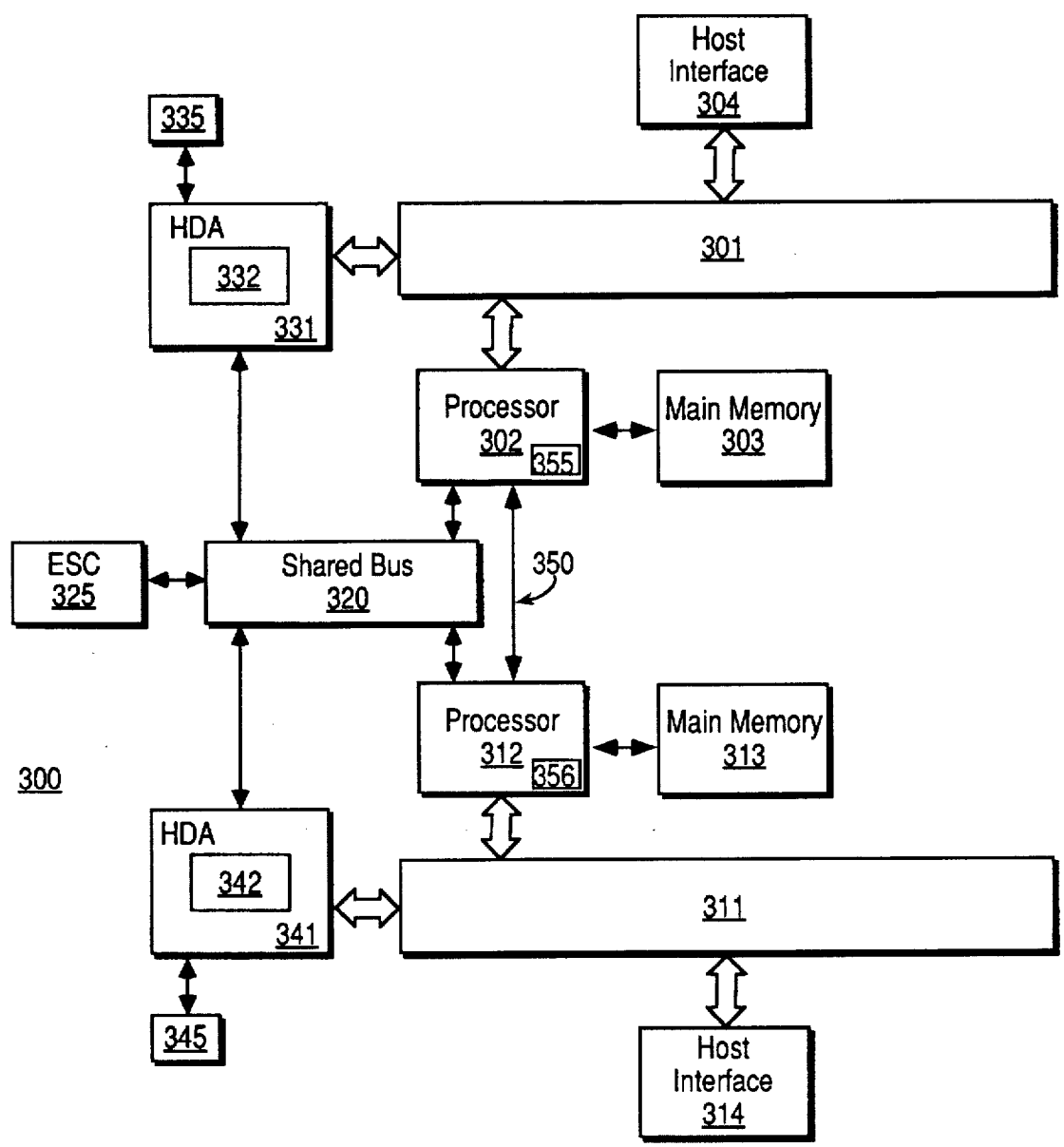
FIGS. 3 illustrates the present invention as implemented in a mass storage system.

FIG. 3 illustrates an embodiment of the present invention as implemented in a mass storage system 300. Mass storage system 300 comprises a first array of storage elements 335 coupled to a hard disk assembly 331 and a second array of storage elements 345 coupled to a hard disk assembly 341. The first and second array of storage elements 335 and 345 are accessed by a host (not shown) via one of the host interface units 304 or 314 and one of buses 301 or 311. Buses 301 and 311 may be implemented, for example, by a conventional fiber channel interface, a serial storage architecture interface, a small computer system interface (SCSI), a P1394 interface, or other well known interfaces. Hard disk assembly 331 comprises to interface the first array of storage elements 335 with bus 301. Hard disk assembly 331 includes a register 332 which is used for storing data to be read by processors 302 and 312. Hard disk assembly 341 operates to interface the second array of storage elements 345 with bus 311. Hard disk assembly 341 includes a register 342 which is used for storing data to be read by processors 302 and 312.

An environmental service center 325 provides environmental services such as temperature control and power to mass storage system 300. Environmental service center 325 also provides data regarding the environmental services of mass storage system 300. Environmental service center 325 may be implemented by any known circuitry. Processor 302 is coupled to bus 301 and shared bus 320. Processor 302 polls the environmental service center 325 by reading environmental service data from environmental service center 325 via shared bus 320. Processor 302 stores the environmental service data in memory unit 303. Processor 302 operates to monitor the environment of mass storage system 300 and maintains the system's integrity when the environment is out of tolerance range. Similarly, processor 312 is coupled to bus 311 and shared bus 320. Processor 312 polls the environmental service center 325 by reading environmental service data from environmental service center 325 via shared bus 320. Processor 312 stores the environmental service data in memory unit 313. Processor 312 operates to monitor the environment of mass storage system 300 and maintains the system's integrity when the environment is out of tolerance range.

Environmental service data from environmental service center 325 may only be accessed by one of processors 302 and 312 via shared bus 320 at a time. Processor 302 is only allowed to access shared bus 320 during its designated bus mastership state. Processor 312 is only allowed to access shared bus 320 during its designated bus mastership state. The bus mastership state of the system 300 is determined by tokens or signals that processors 302 and 312 generate. In one embodiment of the present invention, the bus mastership state is changed by signals generated by processors 302 or 312 when one of the processors gains access to bus 320, relinquishes access to bus 320, or wishes to gain access to bus 320. In another embodiment of the present invention, the signal generated by each processor 302 or 312 may be a single signal or a plurality of signals. In still another embodiment of the present invention, a timer 355 in processor 302 and a timer 356 in processor 312 is set each time mastership of shared bus 320 is taken by a new master. The mastership of shared bus 320 is passed each time the timers 355 and 356 time out. The signals generated by processor 302 are sent to processor 312 via line 350 and the signals generated by processor 312 are sent to processor 302 via line 350. Each processor has a copy of the signals generated by itself and the other processor. Each processor 302 or 312 is aware of the current bus mastership state of the system 300.

Figures 4, 5:
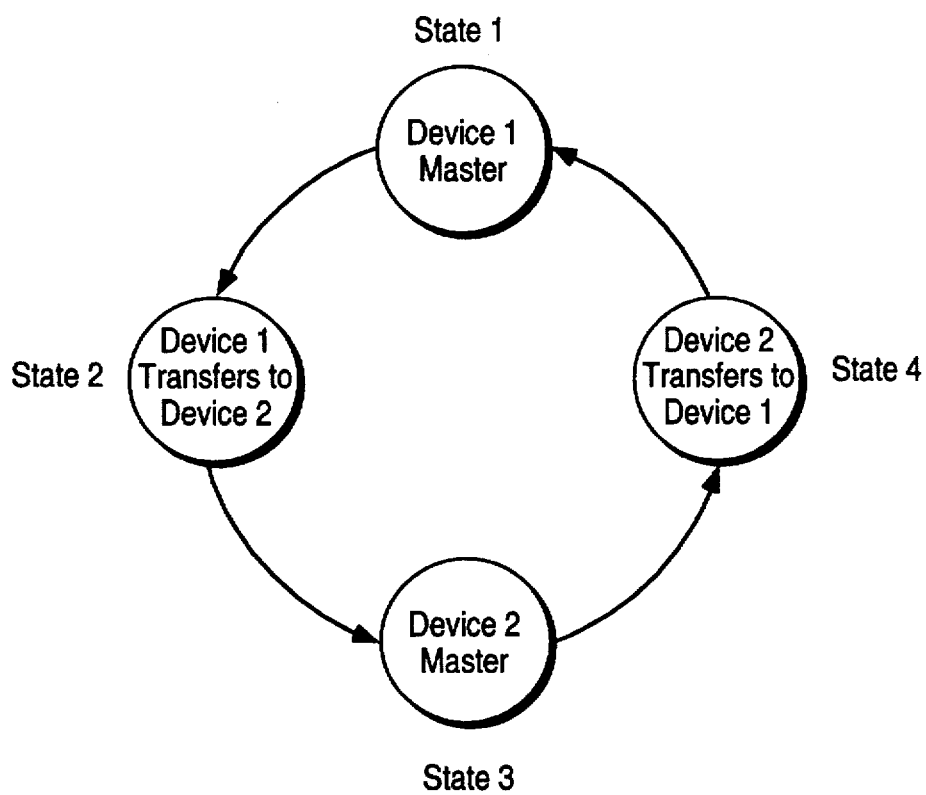
FIG. 4 is a table illustrating the mastership states in one embodiment of the present invention.
FIG. 5 is a state diagram illustrating the transition order of the states illustrated in FIG. 4.

In one embodiment of the present invention, there are four bus mastership states recognized by processors 302 and 312 of system 300. FIG. 4 is a table illustrating the four states. At state 1, processor 302 (Device 1) has mastership of shared bus 320. State 1 occurs when processor 302 generates a 0 signal and processor 312 (Device 2) generates a 0 signal on line 350. At state 2, bus mastership is to be transferred from processor 302 to processor 312. State 2 occurs when processor 302 generates a 1 signal and processor 312 generates a 0 signal on line 350. At state 3, processor 312 has mastership of shared bus 320. State 3 occurs when processor 302 generates a 1 signal and processor 312 generates a 1 signal on line 350. At state 4, bus mastership is to be transferred from processor 312 to processor 302. State 4 occurs when processor 302 generates a 0 signal and processor 312 generates a 1 signal on line 350. FIG. 5 is a state diagram illustrating the order in which states 1–4 shown in FIG. 4 are executed. It should be appreciated that the number of states, the order in which the states are executed, and the number of signals used to represent the states may change depending on the implementation of the present invention.

Figure 6:
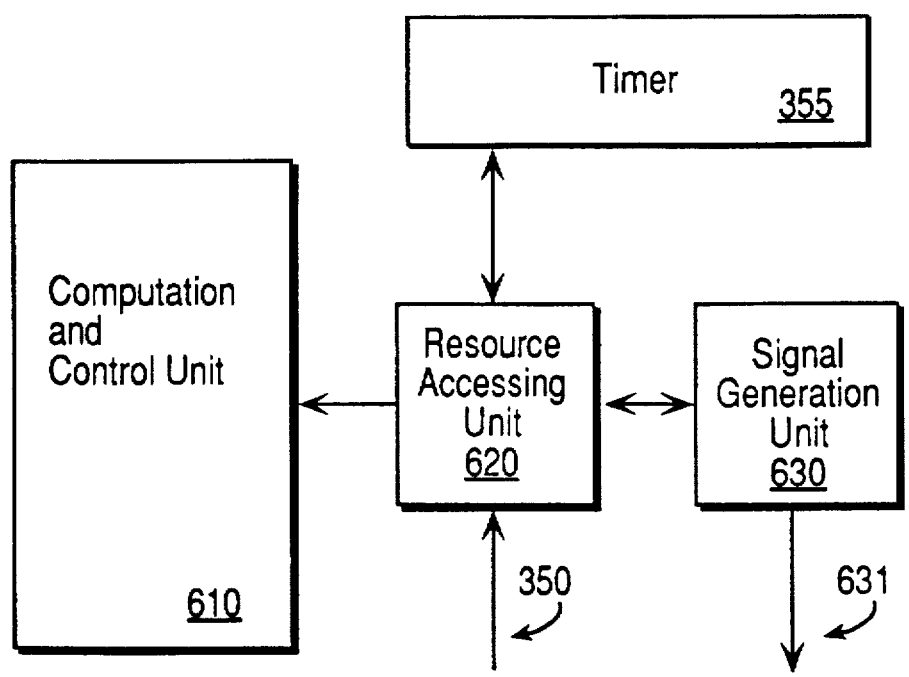
FIG. 6 illustrates a block diagram of one embodiment of a processor implementing the present invention.

FIG. 6 illustrates one embodiment of processor 302. Processor 302 includes computation and control unit 610. In one embodiment of the present invention, computation and control unit 610 includes two fiber channel arbitrated loop ports, a block of embedded RAM, a host bus interface, and a processing unit Computation and control unit 610 operate to poll environmental service data from the environmental service center and to control the environment of computer system 300.

Processor 302 further includes resource accessing unit 620, timer 355, and signal generation unit 631. Resource accessing unit 620 keeps track of the bus mastership states of memory storage system 300 and signals computation and control units 610 to poll the environmental service center 325 when processor 302 receives mastership of shared bus 320. Resource accessing unit 620 receives signals from processor 312 via line 350 which indicate when processor 320 is ready to transition into a next state. Resource accessing unit 620 is coupled to timer 355. Resource accessing unit 620 resets timer 355 when mastership of bus 320 is taken by a new master. After a predetermined amount of time, timer 355 times out. This informs resource accessing unit 620 that shared bus 320 is to be passed to another master. Resource accessing unit 620 instructs signal generation unit 630 to generate a signal on line 631 to indicate that processor 302 is ready to transition into the next state. The bus mastership state of system 300 is determined by the signals generated by processors 302 and 312. Resource accessing unit 620, timer 355 and signal generation unit 630 may be implemented in hardware, software or a combination of hardware and software. In the embodiment of the invention shown in FIG. 6, resource accessing unit 620, timer 355, and signal generation unit 630 are implemented in hardware external to computation and control unit 610. In an alternate embodiment of the present invention, resource accessing unit 620 and signal generation unit 630 are software modules implemented by a set of instructions executed by processor 302. Processor 312 operates similarly to processor 302 and may be implemented by the same components which may be used to implement processor 302.

The present invention allows arbitration of mastership to a shared resource between two devices where neither is master of the other without the use of an external arbiter. In a preferred embodiment of the present invention where the resource accessing unit and signal generation unit is implemented in software, arbitration is achieved without requiring additional power or space from the system.

Although FIG. 6 illustrates an embodiment of the present invention where resource accessing unit 620, signal generation unit 630 and timer 355 reside inside processor 302, it should be appreciated that these components may reside in any agent sharing access to a shared resource to arbitrate access to the shared resource.

In one embodiment of the present invention, processor 302 updates the environmental service data in main memory 313 after processor 302 has polled environmental service data from environmental service center 325 and while system 300 is in a state where processor 302 has bus mastership of shared bus 320. In this embodiment of the present invention, processor 312 also updates the environmental service data in main memory 303 after processor 312 has polled environmental service data from environmental service center 325 and while system 300 is in a state where processor 312 has bus mastership of shared bus 320.

Processor 302 updates the environmental service data in main memory 313 through a data exchange. A second line (not shown) is used to communicate mastership of shared bus 320 between processors 302 and 312 during the data exchange in a manner similar to which line 350 communicates mastership of shared bus 320 during data polling. Processor 302 writes environmental service data into registers 332 and 342 of hard disk assembly 332 and 342 when it has mastership of shared bus 320 during data exchange. Processor 312 reads the environmental system data from registers 332 and 342 when it has mastership of shared bus 320 during data exchange and stores the data into memory unit 313. Processor 302 continues to write new data into registers 332 and 342 until all the environmental service data in memory unit 303 has been written into registers 332 and 342 and transferred into main memory 313. Processor 312 operates similarly to processor 302 in updating the environmental service data in memory unit 303 when system 300 is in a state where processor 312 has mastership of shared bus 320. In an alternate embodiment of the present invention, a single line and a single set of signals are used by processors 302 and 312 to pass mastership of shared bus 320 during polling and exchange of environmental service data.

In a situation where processor 302 becomes inoperable and fails to generate a signal to processor 312 indicating that it is ready to transition into the next bus mastership state within a predetermined period of time, a timer in processor 312 will time out. This will indicate to processor 312 that processor 302 is inoperable. In response, processor 312 will take exclusive bus mastership of shared bus 320. Similarly, in a situation where processor 312 inoperable and fails to generate a signal to processor 312 indicating that it is ready to transition into the next bus generation state within a predetermined period of time, a timer in processor 302 will time out. This will indicate to processor 302 that processor 312 is inoperable. In response, processor 302 will take exclusive bus mastership of shared bus 320.

Figure 7:
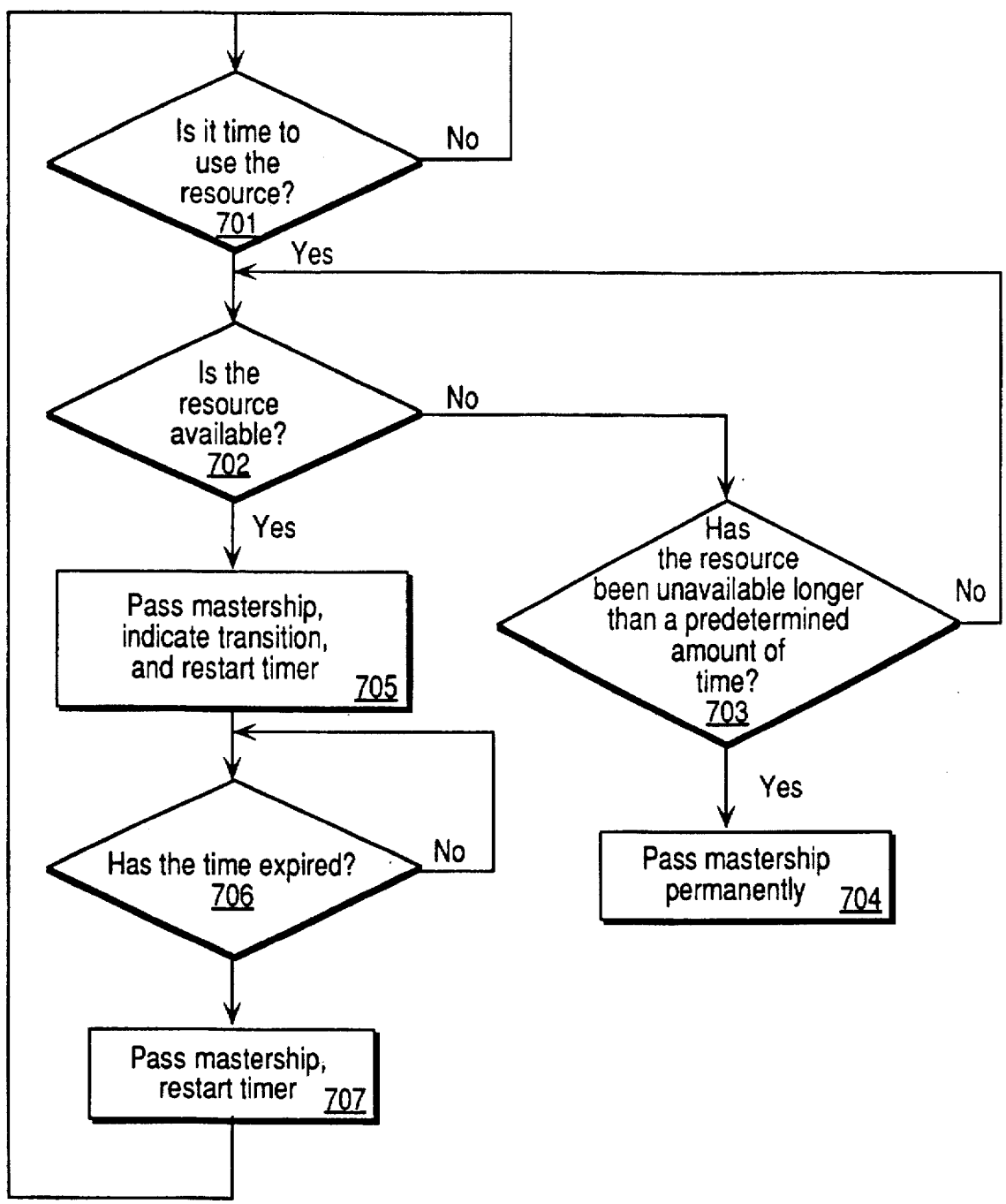
FIG. 7 is a flow chart illustrating a method of passing mastership of a shared resource.

FIG. 7 is a flow chart illustrating a method for passing mastership of a shared resource between two devices. At step 701, it is determined whether to use the shared resource. This determination may be made by checking a timer which records the time a first device has had access to the resource. After a first predetermined amount of time, the timer times out indicating that it is time for the second device to access the shared resource. If it is not time to use the shared resource, control returns to step 701. If it is time to use the shared resource, control proceeds to step 702.

At step 702, it is determined whether the shared resource is available. This determination may be made by checking a resource accessing unit for the current resource mastership state. If the resource mastership state is one where the first device has mastership, the shared resource is unavailable and control proceeds to step 703. If the shared resource is available, control proceeds to step 705.

At step 703, it is determined whether the first device has had mastership of the shared resource for over a second predetermined amount of time. This determination may be made by checking the timer which records the time when the first device had access to the shared resource. If the first device did not have mastership of the shared resource for over the second predetermined period of time, control returns to step 702. If the first device did have mastership of the shared resource for over the second predetermined amount of time, control proceeds to step 704.

At step 704, exclusive mastership of the shared resource is given to the second device and the first device is excluded from being considered a possible master of the shared resource in the future.

At step 705, mastership of the shared resource is given to the second device. A signal is generated indicating that the shared resource has been accessed by the second device and the timer is reset.

At step 706, determine whether mastership of the shared resource should be passed to a different device. This determination can be made by checking to see if the timer has timed out past the first predetermined period of time. If the timer has timed out past the first predetermined period of time, it is time to pass mastership of the shared resource to a different resource and control proceeds to step 707. If the timer has not timed out past the first predetermined period of time, control returns to step 706.

At step 707, a signal is generated by the second device indicating that the second device is ready to transition to the next state of resource mastership where it is not the master of the shared resource. Control proceeds to step 701.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for passing bus mastership, comprising:

determining whether a bus is available;

accessing the bus and generating a signal indicating that the bus is being accessed if the bus is available;

starting a timer in response to accessing the bus, wherein the timer is set to a pre-defined value; and yielding access to the bus when the timer expires.

2. The method of claim 1 further comprising the step of re-starting the timer after yielding access to the bus.

3. The method of claim 1 further comprising the step of generating a signal indicating that access to the bus has been yielded.

4. The method of claim 1 further comprising the step of determining whether the bus has been accessed longer than a predetermined amount of time if the bus is unavailable and gaining access to the bus if the bus has been accessed longer than the predetermined amount of time.

5. The method of claim 1, wherein determining whether the bus is available comprises the step of checking to see whether a bus agent has generated a signal indicating that it is accessing the bus.

6. A computer-readable medium having stored thereon sequences of instructions, the sequences of instructions including instructions which, when executed by a processor, cause the processor to perform the steps of:

determining whether a bus is available;

accessing the bus and generating a signal indicating that the bus is being accessed if the bus is available;

starting a timer in response to accessing the bus; and yielding access to the bus when the timer expires.

7. The computer-readable medium of claim 6 further comprising instructions which, when executed by the processor, would cause the processor to perform the step of re-starting the timer after yielding access to the bus.

8. The computer-readable medium of claim 6 further comprising instructions which, when executed by the processor, would cause the processor to perform the step of generating a signal indicating that access to the bus has been yielded.

9. The computer-readable medium of claim 6 further comprising instructions which, when executed by the processor, would cause the processor to perform the step of determining whether the bus has been accessed longer than a predetermined amount of time if the bus is unavailable and gaining access to the bus if the bus has been accessed longer than the predetermined amount of time.

10. The computer-readable medium of claim 6, wherein the step of determining whether the bus is available comprises the step of checking to see whether a bus agent has generated a signal indicating that it is accessing the bus.

11. A computer system, comprising:

(A) a bus;

(B) a first processor, coupled to the bus, having (1) a first signal generation unit generating a first signal when the first processor has gained access to the bus and generating a second signal when the first processor has yielded access to the bus; and (2) a first bus accessing unit allowing the first processor to access the bus upon receiving a third signal from a second signal generation unit in a second processor coupled to the bus and yielding access to the bus upon receiving a fourth signal from the second signal generation unit.

12. The computer system of claim 11 further comprising an array of storage devices coupled to the first and second processors.

13. The computer system of claim 11 further comprising an environmental service center coupled to the bus.

14. A system for arbitrating a bus between a first bus agent and a second bus agent comprising:

a first signal generation unit generating a first signal when the first bus agent has gained access to the bus and generating a second signal when the first bus agent has yielded access to the bus;

a first bus accessing unit allowing the first bus agent to access the bus upon receiving a third signal and yielding access to the bus upon receiving a fourth signal, wherein the first signal generation unit and the first bus accessing unit reside inside the first bus agent;

a second signal generation unit generating the fourth signal when the second bus agent has gained access to the bus and generating the third signal when the second bus agent has yielded access to the bus; and a second bus accessing unit allowing the second bus agent to access the bus upon receiving the second signal and yielding access to the bus upon receiving the first signal, wherein the second signal generation unit and second bus accessing unit reside inside the second bus agent.

15. The system of claim 14 further comprising an array of storage devices coupled to the first and second bus agents.

16. The system of claim 14 further comprising an environmental service center coupled to the bus.

* * * * *